T. V. FETTIG.
BEET HARVESTING AND TOPPING MACHINE.
APPLICATION FILED AUG. 31, 1915.

1,175,419.

Patented Mar. 14, 1916.

UNITED STATES PATENT OFFICE.

THEODORE V. FETTIG, OF ELWOOD, INDIANA.

BEET HARVESTING AND TOPPING MACHINE.

1,175,419.  Specification of Letters Patent.  Patented Mar. 14, 1916.

Application filed August 31, 1915. Serial No. 48,181.

*To all whom it may concern:*

Be it known that I, THEODORE V. FETTIG, a citizen of the United States, residing at Elwood, in the county of Madison and State of Indiana, have invented certain new and useful Improvements in Beet Harvesting and Topping Machines, of which the following is a specification.

The present invention relates to beet harvesting and topping machines and consists in the combinations and arrangements of parts hereinafter described and particularly set forth in the accompanying claims.

The invention has for its purpose to provide an apparatus comprising means to cut and remove the beets from the ground, to cut off the tops of the beets, and finally to separate the tops thus removed from the beets and convey both beets and beet tops to points remote from the machine where they may be delivered into suitable receptacles. And it is further proposed to provide the mechanism necessary to carrying out the foregoing operations all mounted on a vehicle and operable through the travel thereof.

Another object of the invention consists in providing a beet harvester of this character wherein the different units of the apparatus are related or inter-dependent, one upon the other, to the end that the same will operate as a single machine for removing and freeing the beets from the earth to their final discharge. And in which the mechanism is simple in construction and manner of working, and readily controllable from the position of the operator.

The invention is shown by way of illustration in the accompanying drawings in which:—

Fig 4ª is a sectional view taken on the line 4ª—4ª of Fig. 2.

The beet carrier and topper consists essentially of five units, to wit: means for cutting and partially raising the beets from the earth; an apparatus for pulling from the ground the beets thus raised; an apparatus for topping the beets; tripping apparatus associated with the beet puller and topping apparatus for timing the functions of the latter; and the conveyers for separating and removing the beets and the beet tops, and in this relation the machine will now be described.

The beet cutter, or "plow", consists of a blade 1 mounted on the extension 2 of the arm 3 that is fulcrumed on the shaft 4 of the vehicle frame 5, and said blade is located at the proper position in the ground and upwardly inclines toward the rear, whereby to initially lift the beet when the same has been cut from its roots. The arm extension 2 is pivotally mounted on the arm 3 at the point 6, and an easily breakable pin 7 forms the rigid joint between the arm 3 and its extension so it will break and allow the blade to swing upwardly or give in the event it should strike a rigid obstacle.

Figure 1:
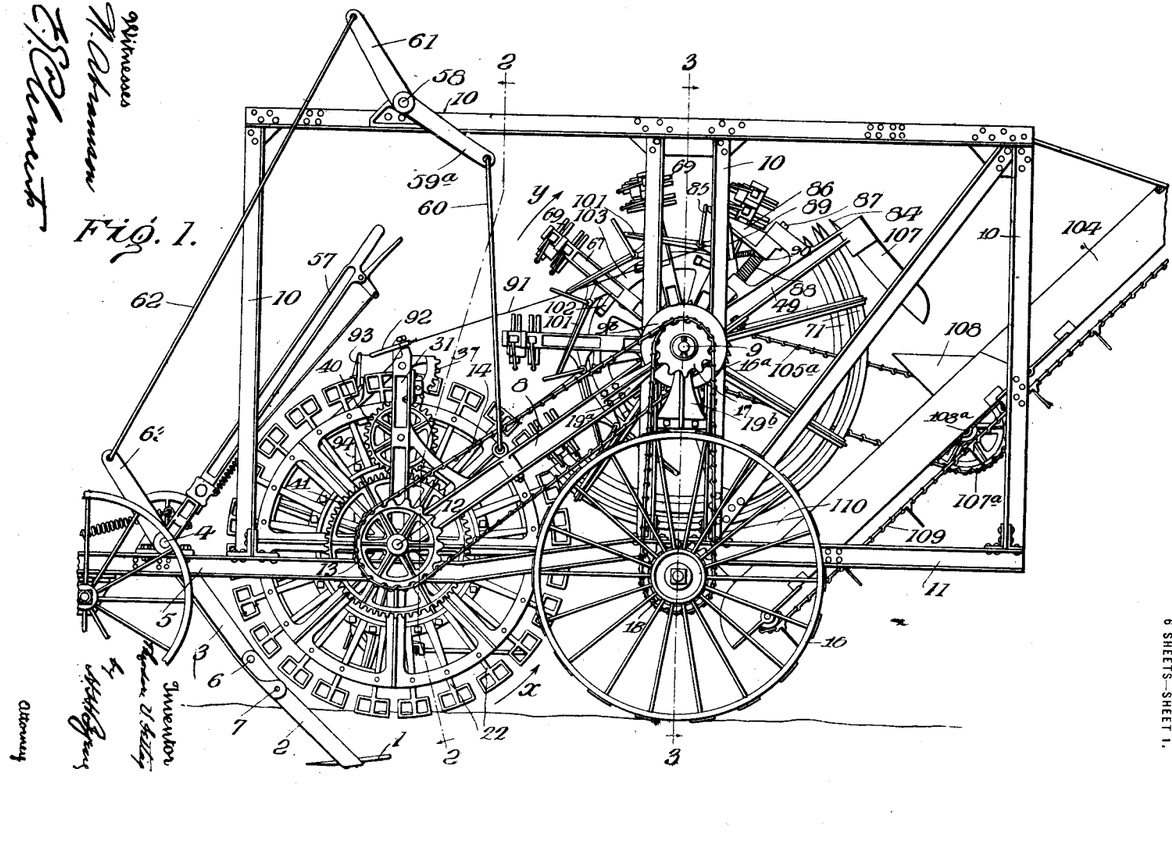
Figure 1 is a side elevational view of the machine complete.
Figure 3:
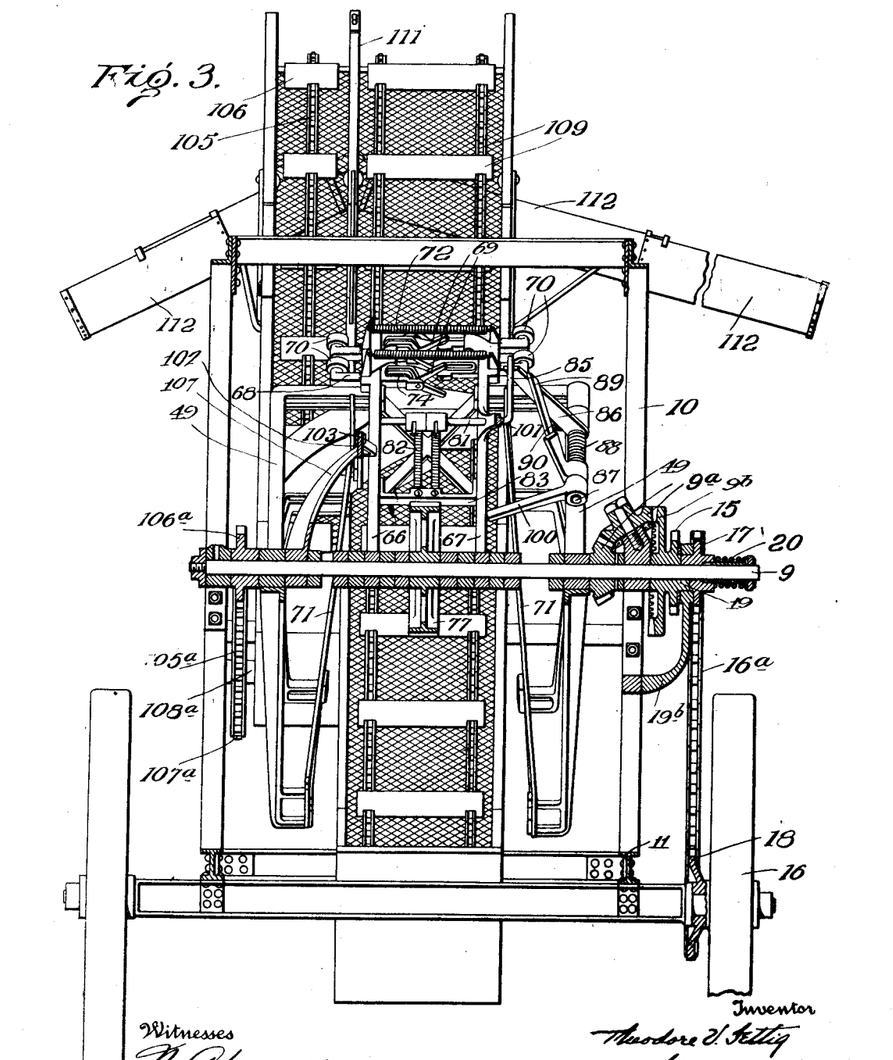
Fig. 3 is a transverse sectional view taken on the line 3—3 of Fig. 1 and looking in the direction of the arrows.
Figure 14:
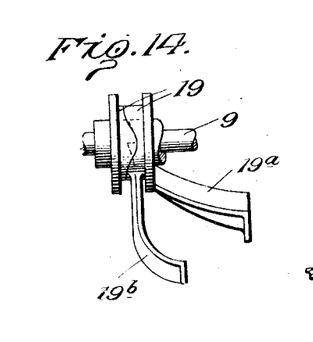
Fig. 14 is a detailed view of the clutch drive between the vehicle and the machine.

The beet pulling apparatus comprises a frame 8 that is swingingly mounted on the shaft 9 suitably journaled in the framework 10 on the body 11 of the vehicle. A shaft 12 is journaled on the free end of the frame 8 and has a sprocket wheel 13 connected to be driven from the shaft 9 by the chain 14 that engages with the sprocket wheel 15 on said shaft 9. The sprocket 15 is in turn driven from the sprocket 18 on the wheel 16 by the chain 16ª riding on sprocket wheel 17. Said sprockets 15 and 17 are mounted to turn freely on the shaft 9, and a releasable clutch 19, having a tensioning spring 20 (see Figs. 3 and 14) forms the direct driving connection between the sprockets 15 and 17. One member of the clutch 19 is secured to an arm 19ª fixed on the swinging frame 8 (see Fig. 1) and the other clutch member is fixed to the arm 19ᵇ (see Fig. 3) on the vehicle frame 10 so that when the swinging frame 8 is raised the clutch members will be disconnected to throw the machine out of gear.

Figures 5, 6, 7, 8, 9:
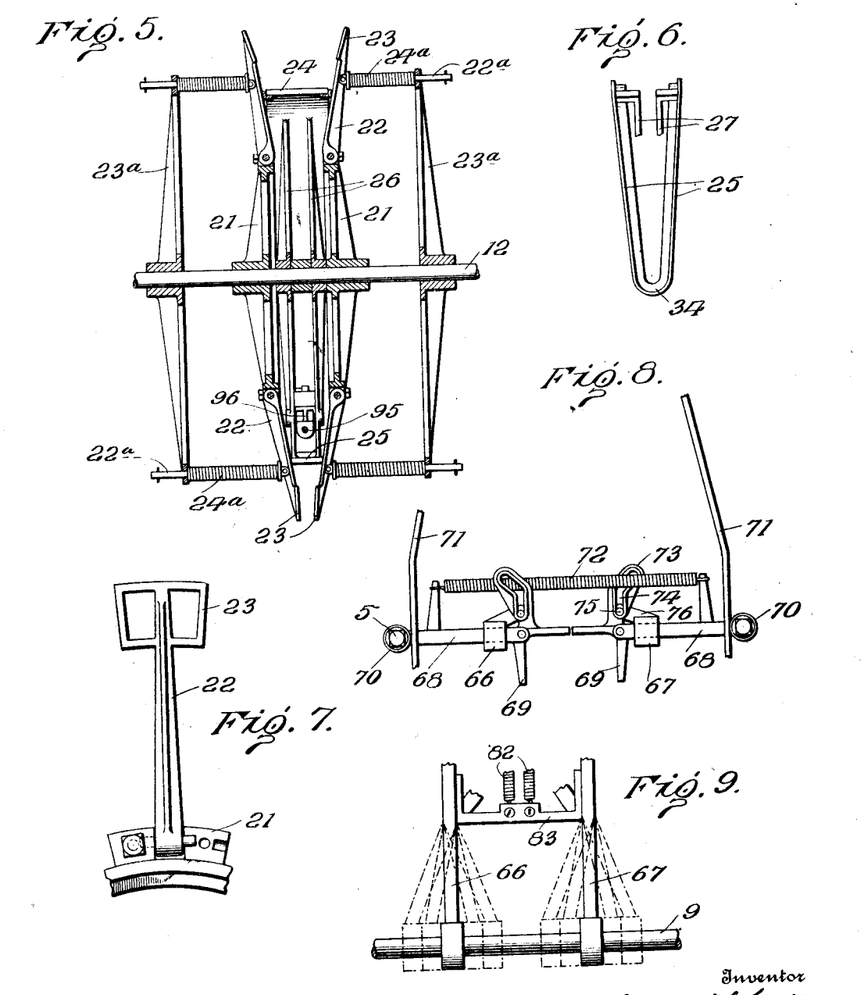
Fig. 5 is an enlarged central sectional view of the beet puller.
Fig. 6 is a detailed view of the spreader for the cam track.
Fig. 7 is a detailed view of one of the beet puller arms.
Fig. 8 is a detailed view of a pair of grips of the beet carrier.
Fig. 9 is a diagrammatic view of the grip carriers.

A pair of "shoulder" wheels 21 is fixed to rotate with the shaft 12 and has hingedly mounted on the shoulders or peripheries thereof, each a series of beet puller arms 22 (see Figs. 5 and 7), and said arms are arranged in coöperable pairs and have their active ends constructed to form hands 23 which grab the beets as the latter are raised by the blade 1 progressively with the travel of the vehicle. The puller arms 22 are adapted to be operated in the direction of the arrow X to grip and release the beets at proper intervals through the medium of cam tracks formed in two sections 24 and 25, connected by frames 26 and 27 respectively to the axle 12, and the beet puller arms are held in engagement with the cam tracks by means of spring tensioned rods 22ª mounted on said arms and on rotatable carriers or frames 23ª, rotatable with the shaft 12. The tensioning springs 24ª of the rods 22ª act to hold said puller arms in engagement with the cam tracks and to close said arms to grip the beets at the proper periods of their rotation.

Figure 2:
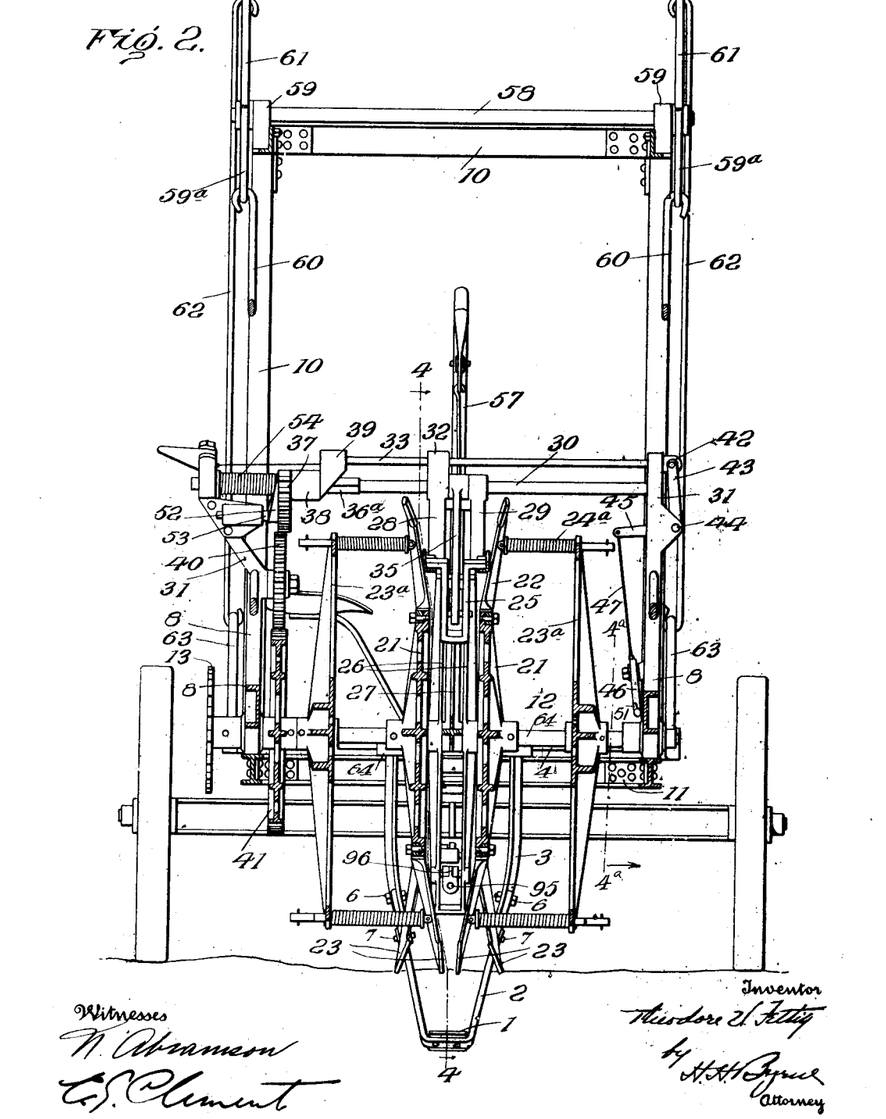
Fig. 2 is a transverse sectional view taken on the line 2—2 of Fig. 1 and looking in the direction of the arrows.

The section 24 of the cam tracks is held rigid by a pair of arms 28 and 29 (see Figs. 2 and 4) secured to said tracks and mounted on the shaft 30 that is suitably journaled in the uprights 31 on the swinging frame 8. The arm 28 is formed with an extension 32 apertured to receive the rod 33 adapted to slide therethrough, and the rod is slidably mounted in one of the uprights 31. The cam tracks 25 are mounted to oscillate on the shaft 12, whereby to forcibly bring the "nose" or wedge end 34 (see Fig. 6) to enter between the pairs of beet puller arms at the proper intervals and instantly release the beet to be grabbed by the carriers that convey the beets to the topping device, as will be presently described.

The cam tracks 25 are actuated by a link or lever 35 (see Figs. 2 and 4) that is secured to oscillate with the shaft 30 and is connected to a slotted lug 36 on the frame 27. The shaft 30 has a squared portion 36ª slidably mounting a toothed quadrant 37 by a sleeve 38 that has a shoulder 39, and said toothed gear 37 is adapted to be brought into mesh with the pinion 40 journaled on the upright arm 31 and meshing with the pinion 41 that constantly rotates with the shaft 12. The push rod 33 is connected at one end 42 to an arm of the bell-crank lever 43 that is fulcrumed at 44 to the upright 31 and whose other arm 45 connects to a second bell-crank lever 46 by an arm or wire 47 (see Fig. 2). The bell-crank lever 46 is adapted to be operated to shift the gearing 37 into mesh with the pinion 40 from the mechanism that carries the beets to be topped. Said mechanism, comprising rotatable shafts, intermittently strikes a projecting arm 48 mounted on the frame arm 49 and which connects to one arm of the bell-crank lever 50, also fulcrumed on said arm 49 and connecting with the bell-crank lever 46 by the rod or wire 51 (see Fig. 4ª). When the quadrant gear 37 is shifted to engage with the pinion 40, the shaft 30 is oscillated, and in turn operates the movable cam track section 25 with which said shaft 30 connects through the link 35, and a cam 52 mounted on the quadrant acts against a spring pressed pin or latch 53, and when said quadrant has completed its movement, the latch 53 moves to engage the end of the cam and temporarily hold the quadrant. Said latch 53 is mounted on the upright 31 of the swinging frame (see Fig. 2). A spring 54 is mounted on the shaft 30 and has its respective ends secured to said quadrant pinion 37 and the fixed upright 31, and acts to displace the quadrant pinion from engagement with the pinion 40, when the weight 55 (see Fig. 4) swings the cam track section and the quadrant pinion back to normal positions. Said weight 55 is mounted on the arm 56 that is a part of the track supporting frame 27 and is released to swing at the end of each rotation of the quadrant gear 37. Said frame 27 and the weight 55 are connected by lever 35 with the shaft 30 that carries the quadrant gear 37 having the cam 52.

The blade 1 and the frame carrying the beet puller apparatus are adapted to be raised clear of the ground by means of the hand-operated lever 57 fulcrumed on the shaft 4, and a rocker shaft 58 that is journaled in suitable bearings 59 on top of the frame 10; and said rocker shaft carries a pair of levers 59ª connecting with the frame 8 by rods 60, and a second pair of levers 61 connect, by rods 62, to the levers 63 secured to the respective ends of the shaft 4. The blade carrying arms 3 are independently mounted on the shaft 4 and have sleeves 64 formed with slots to receive the pins 65 whereby the initial motion of the lever 57 will first elevate the frame 8 from its position of support on the body 11 of the vehicle and the further movement of said lever will raise the blade 1 from the ground.

The beet carrier and topping mechanism consists of a plurality of pairs of staffs 66 and 67 (see Figs. 3, 8 and 9) mounted to freely rotate on the shaft 9 in the direction of the arrow Y through the miter-gear 9ª that drives the ratchet wheel 77 secured on the shaft 9, and said miter-gear is in turn driven by the bevel gear 9$^b$, that is secured to the sprocket wheel 15, said staffs are arranged in pairs; and each of said pairs of staffs is equipped with two pairs of slide bars 68 that carry gripping devices 69 that are constructed preferably angular and pivotally connected to their respective slide bars. The slide bars 68 have mounted on their outer ends rollers 70 adapted to engage respectively with cam tracks 71 that act, through the rotation of the staffs, to spread or separate the slide bars carrying the grippers, and a spring 72 acts to draw the slide bars together, as will be understood. Each pair of grippers 69 is formed with extensions 73 having cam slots 74 within which work pins 75 on arms 76 carried by the staffs, and said cam slots and pins operate to hold the grippers in open or closed position accordingly as said slide bars are moved inwardly or outwardly (see Figs. 3 and 8).

Figures 10, 11:
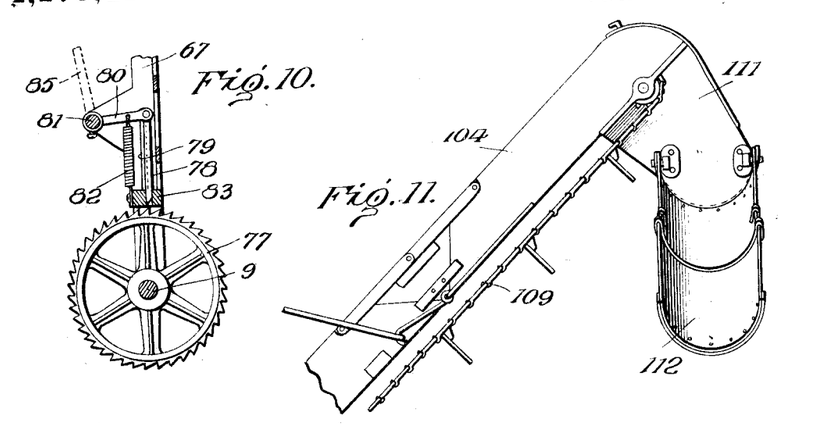
Fig. 10 is a central sectional view of the grip carrier operating device.
Fig. 11 is a detailed view of the beet conveyer and chute therefor.

The staffs 66 and 67 are rotated on the shaft 9 by means of a ratchet wheel 77 (see Figs. 3 and 10) fixed on the shaft 9 and adapted to engage with pawls 78 and 79 depending from arms 80 mounted on the shaft 81 which is, in turn, journaled on the staffs, as shown; and said pawls 78 and 79 are independently moved into engagement with the teeth of the ratchet wheel 77 by means of a pair of springs 82 secured to arms 80 and the cross-piece 83 connecting the staffs. When the staffs carrying the beets have been brought to a point slightly beyond their uppermost positions, the pawls 78 and 79 thereof are engaged by the ratchet wheel 77, and this movement brings the beets against the edge of the cutter 84 that removes the beet tops. The releasing of said staffs is automatically effected by a lever 85 (see Figs. 1, 3 and 10) that is formed continuous with each shaft 81, and said lever 85 is adapted to engage with a swiveled stop 86 mounted on a pivot pin 87 secured to the frame arm 49, and said stop 86 is normally held out of the path of the levers 85 of the several pairs of staffs by a torsion spring 88 whose respective ends are secured to the frame extension 49 and the stop. A latch 89, also mounted on the frame extension 49, engages with the stop 86 and tends to hold the same in the path of said levers 85 through the action of a spring 90 connected to said latch 89. The function of stops 86 is therefore to trip the levers 85 and raise the pawls 78 and 79 from engagement with the ratchet wheel 77 and momentarily hold the staffs from further motion, i. e. just in advance of the topper blade 84, and said stops are then moved by the tripping apparatus to restore the driving connection with the ratchet wheel 77, when the shafts carrying the beet are moved forward and later release the gripped beets by reason of the spreading of the cam tracks.

Figures 4, 4A, 17, 18, 19, 20:
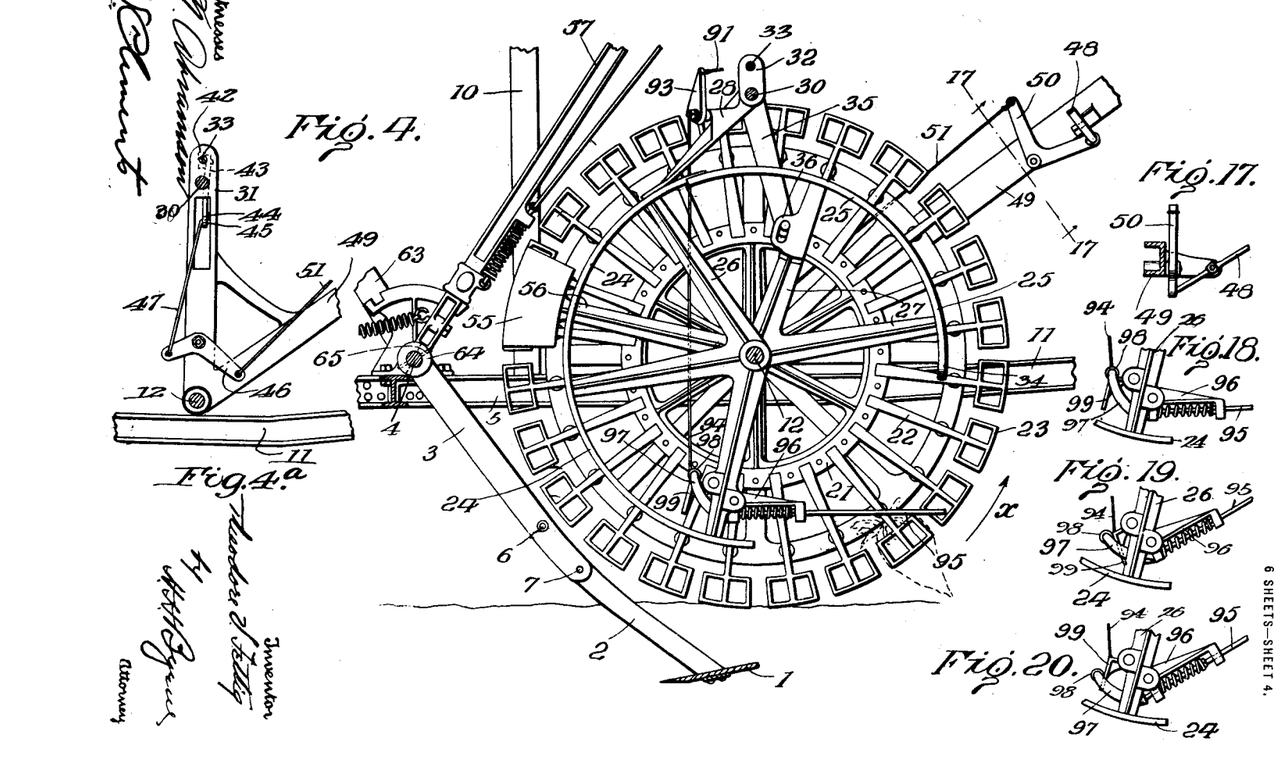
Fig. 4 is an enlarged sectional view taken on line 4—4 of Fig. 2.
Fig. 17 is a detail view of cam track actuating member for spreading the beet puller arms.
Figs. 18, 19, and 20 are detailed views of the beet operated tripping device in different positions.

The tripping apparatus for moving the stop 86 from the path of the levers 85 consists of a wire 91 (see Figs. 1, 4, 18, 19, and 20) connecting with the bell-crank lever 92 mounted on the upright 31 and which, in turn, connects with a second bell-crank lever 93 attached to a wire 94 leading to a tripping device mounted on a leg of the cam track frame 26 (see Fig. 4). Said tripping device consists of a rod 95 slidably mounted in the bracket 96 that is secured to said frame 26, and an arm 97 is connected to the rod 95 and carries a roller 98. A cam lever 99, pivoted on the frame 26, is connected to said wire 94 and is so shaped that it permits the roller 98 to slip off after said cam lever has been pulled down a sufficient distance to disengage the latch 89 from holding the stop 86. The cam lever 99 is also so shaped that after it is restored to its original position it forces rod 95 to slide back quickly to original position. As soon as the staffs have been permitted to pass the stop 86, said staffs engage with a projecting arm 100 connected to move the stop 86 in position to interrupt or halt the following pair of staffs through disengaging their driving connection with the pinion 77, in the manner just stated.

Figure 15:
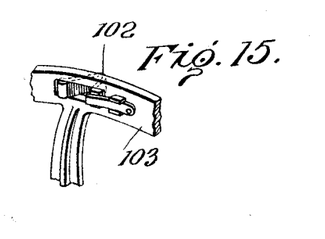
Fig. 15 is a perspective view of the catch for limiting the movement of the grip arms.
Figure 16:
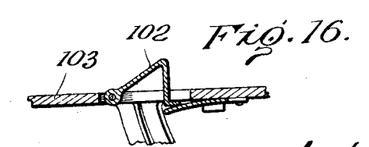
Fig. 16 is a longitudinal sectional view of the catch.

Each staff 67 carries a rearwardly extended arm 101, so disposed that the several arms will be simultaneously moved back to engage with the trip levers 85 of their respective following staffs, and thus halt the staffs against crowding and at their properly spaced positions. The staffs are prevented from falling backward by means of a series of spring-pressed catches 102 (see Figs. 1, 15 and 16) that are mounted on the segmental rail 103 suitably secured to the frame 10 and adapted to engage the staff arms 66. Said catches are disposed to allow the staffs to pass freely in one direction, but prevent their movement in the opposite direction, as will be understood from an inspection of Figs. 3, 15 and 16.

After the beet has been topped by the blade 84, the staffs swing along the cam tracks 71 and, when said tracks spread, the slide bars 68 are separated and the grippers 69 opened to release the beet into its conveyer, and following this, said staffs are moved on until stopped by the trailing arm 101 of the immediately preceding pair of staffs. i. e. approximately at the point of the frame 8. Here the cam tracks end and the grippers 69 close on the beet now held ready by the puller arms 22, and which is the same beet that previously released the latch 89 by engaging with the trip bar 95.

Figure 12:
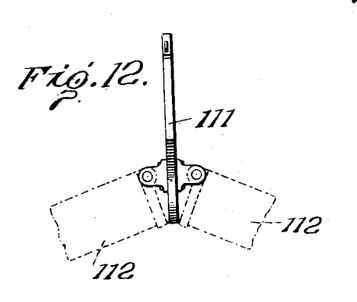
Fig. 12 is an end view of the chutes support and separator therefor.
Figure 13:
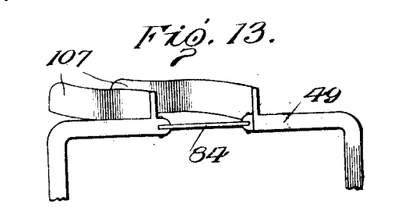
Fig. 13 is a front view of the beet topper and guide.

The conveying apparatus consists of a frame 104 suitably mounted on the frame 11 of the vehicle and supporting the traveling chain 105 that carries a plurality of blades or cross-boards 106 (see Fig. 3), and said chain is driven from the axle 9 by the chain 105$^a$ riding on pinions 106$^a$ and 107$^a$ on the shafts 9 and 108$^a$ respectively. The endless carrier (105 and 106) is adapted to receive the beet tops falling from the chute 107 onto said carrier between the side guards 108 mounted on the conveyer frame 104. A similar endless carrier 109, driven with the first carrier, is mounted to travel on the frame 104 and receives the beets at the point where the cam tracks 71 widen, and side guards 110 are mounted on the frame 104 at this position. The discharging ends of the two conveyers are located on the two sides of a dividing board 111 (see Figs. 11 and 12), and a pair of chutes 112 is hingedly mounted on the dividing board and project on the two sides thereof in the manner shown in Fig. 3. The bottoms of the conveyers are covered with heavy wire mesh which permits the soil shaken from the beets to sift through.

It is obvious that those skilled in the art may vary the details of construction and arrangement of parts without departing from the spirit of the invention, and therefore I do not wish to be limited to such features except as may be required by the claims.

Having thus described my invention, what I claim as new and desire to protect by United States Letters Patent is:

1. In a beet harvesting machine the combination of a vehicle, means carried by the vehicle for cutting and partially raising the beets from the ground; rotatable supports mounted on the vehicle, beet puller arms hingedly mounted in pairs on said supports, cam tracks located between said pairs of arms, rotatable frames mounted on the vehicle, spring tensioned rods carried by said arms and the rotatable frames and operable to hold the arms in engagement with said cam tracks, and means for rotating said supports and frames to actuate the arms, substantially as set forth.

2. In a beet harvesting machine the combination of a vehicle, means carried by the vehicle for cutting and partially raising the beets from the ground, beet puller arms arranged in pairs and rotatably mounted on the vehicle, cam tracks located between said puller arms and having a movable section, means for holding the arms in engagement with said cam tracks, means for rotating the arms through the travel of the vehicle, and automatically operable means for intermittently actuating said movable cam track section to separate said arms to engage the beets, substantially as set forth.

3. In a beet harvesting machine the combination of a vehicle, means carried by the vehicle for cutting and partially raising the beets from the ground, beet puller arms arranged in pairs and rotatably mounted on the vehicle, cam tracks located between said puller arms and having an oscillative section adapted to spread said pairs of arms, means for holding the arms in engagement with said cam tracks, means for rotating the arms through the travel of the vehicle, and automatically operable means for intermittently actuating said oscillative track section to separate the arms to engage the beets, substantially as set forth.

4. In a beet harvesting machine the combination of a vehicle, means carried by the vehicle for cutting and partially raising the beets from the ground, rotatable supports mounted on the vehicle, beet puller arms arranged in pairs and hingedly mounted on said supports, rotatable frames mounted on the vehicle, cam tracks located between said rotatable arms and having an oscillative section adapted to spread said pairs of arms, spring pressed rods carried by said rotatable supports and frames and operable to hold said puller arms in engagement with the cam tracks, and means for operating said puller arms and intermittently actuating said oscillative section to separate the arms to engage the beets, substantially as set forth.

5. In a beet harvesting machine the combination of a vehicle, means carried by the vehicle for pulling the beets from the ground comprising rotatable gripping arms arranged in pairs, movable cam tracks adapted to separate said pairs of arms to grip the beets, a link fulcrumed on the vehicle and connected to actuate the cam tracks, and a gearing connected to intermittently operate said link through the travel of the vehicle, substantially as set forth.

6. In a beet harvesting machine the combination of a vehicle, means carried by the vehicle for pulling the beets from the ground comprising rotatable gripping arms arranged in pairs, movable cam tracks adapted to separate said pairs of arms to grip the beets, a link fulcrumed on the vehicle and connected to actuate the cam tracks, a gearing driven from the vehicle, a segmental gear connected to said link, and automatically actuated means for connecting the segmental gear to said driven gearing, substantially as set forth.

7. In a beet harvesting machine the combination of a vehicle, means carried by the vehicle for pulling the beets from the ground comprising rotatable gripping arms arranged in pairs, movable cam tracks adapted to separate said pairs of arms to grip the beets, a link fulcrumed on the vehicle and connected to actuate the cam tracks, a gearing driven from the vehicle, a segmental gear slidably mounted on the vehicle and connected to said link, automatically actuated means for shifting the segmental gear to engage the driven gearing, and automatically actuated means for disconnecting the segmental gear from the driven gearing, substantially as set forth.

8. In a beet harvesting machine the combination of a vehicle, means carried by the vehicle for pulling the beets from the ground comprising rotatable gripping arms arranged in pairs, movable cam tracks adapted to separate said pairs of arms to grip the beets, a shaft journaled on the vehicle, a link fixed on said shaft and connected to actuate said cam tracks, a gearing driven from the vehicle, a segmental gear slidably mounted on the link shaft and adapted to engage with said driven gearing to operate the cam tracks, and automatically actuated means for connecting and disconnecting the segmental gear from the driven gearing, substantially as set forth.

9. In a beet harvesting machine the combination of a vehicle, means carried by the vehicle for pulling the beets from the ground comprising rotatable gripping arms arranged in pairs, movable cam tracks adapted to separate said pairs of arms to grip the beets, a shaft journaled on the vehicle, a link fixed on said shaft and connected to actuate said cam tracks, a gearing driven from the vehicle, a segmental gear slidably mounted on the link shaft and adapted to engage with said driven gearing to operate the cam tracks, a push rod automatically operable to shift the segmental gear to engage the driven gearing, and a spring and a cam element mounted on the link shaft and segmental gear respectively and coöperable to automatically disconnect the segmental gear and restore the same to normal, substantially as set forth.

10. In a beet harvesting machine the combination of a vehicle, means carried by the vehicle for pulling the beets from the ground comprising rotatable gripping arms arranged in pairs, movable cam tracks adapted to separate said pairs of arms to grip the beets, a shaft journaled on the vehicle, a link fixed on said shaft and connected to actuate said cam tracks, a gearing driven from the vehicle, a segmental gear slidably mounted on the link shaft and adapted to engage with said driven gearing to operate the cam tracks, a push rod connected to the segmental gear, a bell-crank lever mounted on the vehicle and automatically operable to actuate said push rod to connect the segmental gear to the driven gearing, a cam mounted on the segmental gear, and a spring mounted on the link shaft, said cam and spring being coöperable to automatically disconnect the segmental gear and restore the same to normal, substantially as set forth.

11. In a beet harvesting machine the combination of a vehicle, means for cutting and partially raising the beets from the ground, a shaft, beet puller arms arranged in pairs and rotatably mounted on said shaft, cam track sections fixedly mounted between said puller arms, cam track sections adapted to spread said arms mounted to oscillate on said shaft, means automatically operable to actuate said oscillative cam track sections, said cam track sections adapted to coöperate with the beet puller arms, a weight connected to said oscillative cam track sections adapted to restore the same to normal, and means for operating the shaft of the beet puller arms from the vehicle, substantially as set forth.

12. In a beet harvesting machine the combination of a vehicle, means for cutting and partially raising the beets from the ground, a shaft, beet puller arms arranged in pairs and rotatably mounted on said shaft, a frame fixedly mounted on the shaft, cam track sections mounted on said frame, a frame mounted to oscillate on the shaft, cam track sections mounted on said oscillative frame, said cam track sections adapted to coöperate with the beet puller arms, a gearing adapted to intermittently actuate the oscillative track sections from the vehicle, a weight connected to said oscillative frame adapted to restore the same to normal, and means for operating the shaft of the beet puller arms from the vehicle, substantially as set forth.

13. In an apparatus for topping beets the combination of a plurality of rotatable staffs, bars slidably mounted on said staffs, gripper arms carried by said slidable bars adapted to hold the beets, a knife disposed in the path of the beets carried by the staffs, means for operating the staffs, and means for actuating the slidable bars to release the beets from said gripper arms, substantially as set forth.

14. In an apparatus for topping beets the combination of a plurality of rotatable staffs, bars slidably mounted on said staffs, gripper arms carried by said slidable bars adapted to hold the beets, a knife disposed in the path of the beets carried by the staffs, means for operating the staffs, and cam tracks for engaging the slidable bars to release the beets from said gripper arms, substantially as set forth.

15. In an apparatus for topping beets the combination of a plurality of rotatable staffs, bars slidably mounted on said staffs, gripper arms carried by said slidable bars adapted to hold the beets, springs carried by the slidable bars adapted to hold said gripper arms in operative position, a knife disposed in the path of the beets carried by the staffs, means for operating the staffs, and cam tracks for engaging the slidable bars to release the beets from said gripper arms, substantially as set forth.

16. In an apparatus for topping beets the combination of a plurality of rotatable staffs, bars slidably mounted on said staffs, gripper arms carried by said slidable bars adapted to hold the beets, springs connecting said slidable bars adapted to hold the gropper arms in operative position, members having cam slots mounted on said gripper arms, pins mounted on the staffs engaging the cam slotted members adapted to hold the gripper arms in open or closed position, means for operating the staffs, a topping knife, and cam tracks for engaging the slidable bars to release the beets from said gripper arms, substantially as set forth.

17. In an apparatus for topping beets the combination of a plurality of rotatable staffs, bars slidably mounted on said staffs, gripping members pivotally mounted on said slidable bars adapted to hold the beets, springs connecting said slidable bars adapted to hold the grippers in operative position, members having cam slots mounted on said grippers, pins mounted on the staffs engaging the cam slotted members to hold the grippers in open or closed position, means for operating the staffs, rollers mounted on the slidable bars, a topping knife, and cam tracks for engaging said rollers to release the beets from said grippers, substantially as set forth.

18. In an apparatus for topping beets the combination of a plurality of rotatable staffs arranged in pairs, two pairs of bars slidably mounted on each pair of said staffs, an upper and a lower pair of gripper arms mounted on the slidable bars of each pair of staffs and adapted to hold the beets, means for operating the staffs, a topping knife, and cam tracks for engaging said slidable bars to release the beets from the gripper arms, substantially as set forth.

19. In an apparatus for topping beets the combination of a shaft, a plurality of staffs loosely mounted on said shaft, means carried by said staffs for holding the beets, a topping knife, a pawl and ratchet drive for rotating the staffs upon the shaft, and means for releasing the topped beets, substantially as set forth.

20. In an apparatus for topping beets the combination of a shaft, a plurality of staffs loosely mounted on said shaft, means carried by said staffs for holding the beets, means associated with the shaft for carrying the staffs, a topping knife, and means for releasing the topped beets, substantially as set forth.

21. In an apparatus for topping beets the combination of a shaft, a beet topping knife, a plurality of beet holding staffs loosely mounted on said shaft and operable to bring the beets against said topping knife, means mounted on the shaft for engaging the staffs and carrying the same to top the beets, and means for releasing the topped beets, substantially as set forth.

22. In an apparatus for topping beets the combination of a shaft, a beet topping knife, a plurality of beet holding staffs loosely mounted on said shaft and operable to bring the beets against said topping knife, a ratchet wheel rotatable on the shaft, pawls carried by said staffs adapted to engage said said ratchet wheel to raise the staffs, trips for actuating said pawls to release the staffs carrying the betts, and means for releasing the topped beets, substantially as set forth.

23. In a beet harvester and topping machine the combination of means for moving the beets from the ground, a plurality of rotatable carriers having means to receive the beets, a topping knife, means for temporarily holding the carriers in advance of the topping knife, means operable from the beet removing means to release said carriers to bring the beets to engage the topping knife, means for releasing the topped beets from the carriers, and means for operating the beet removing means and the beet carriers, substantially as set forth.

24. In a beet harvester and topping machine the combination of means for removing the beets from the ground, a plurality of rotatable carriers having means to carry the beets, a topping knife located adjacent the path of the carried beets, a device for temporarily holding the carriers in advance of the topping knife, a tripping device carried by the beet removing means and connected to automatically release the carriers to bring the beets to engage the topping knife, means for releasing the topped beets from the carriers, and means for operating the beet removing means and the beet carriers, substantially as set forth.

25. In a beet harvester and topping machine the combination of means for removing the beets from the ground, a plurality of rotatable carriers adapted to receive the beets from said removing means, means for moving said carriers, a topping knife located adjacent the path of the carriers, a stop located in advance of said topping knife adapted to temporarily hold the carriers thereat, means carried by the several carriers for holding the same through the carrier held by said stop, a tripping device associated with the beet removing means connected to automatically release said stop to allow the carriers to move, means for releasing the topped beets, and means for actuating said beet removing means and the carriers, substantially as set forth.

26. In a beet harvester and topping machine the combination of means for removing the beets from the ground, a plurality of rotatable carriers adapted to receive the beets from said removing means, pawl and ratchet driving mechanism for rotating the carriers, a topping knife located adjacent the path of the rotatable carriers, a stop located in advance of said topping knife adapted to successively and automatically disconnect the pawl and ratchet driving mechanism of said carriers, means associated with the several carriers for holding the same against rotation through the carrier held by said stop, a tripping device associated with the beet removing means connected to automatically release said stop whereby to restore the driving connections of said carriers, means for releasing the topped beets, and means for actuating said beet removing means and the carriers, substantially as set forth.

27. In a beet harvester and topping machine the combination of means for removing the beets from the ground, a plurality of rotatable carriers adapted to receive the beets from said removing means, a constantly rotating ratchet wheel, pawls mounted on said carriers adapted to engage with said ratchet wheel to move said carriers, a topping knife located adjacent the path of the carriers, a stop located in advance of the topping knife, levers mounted on said carriers and connected to actuate the respective pawls thereof, said levers adapted to successively engage with said stop and disconnect the pawls from the ratchets, rearwardly extended arms mounted on said carriers adapted to engage respectively the pawl levers of the following carriers and disconnect the same from the ratchet wheel, means for holding the carriers against falling backward, a latch for holding said stop in operative position, a tripping device associated with said beet removing means connected to automatically actuate the latch to release the stop whereby to permit the carriers to rotate, means for releasing the topped beets, means for actuating said beet removing means and the carriers, and conveyers for removing the beet tops and the topped beets, substantially as set forth.

In testimony whereof I affix my signature in presence of two witnesses.

THEODORE V. FETTIG.

Witnesses:
THOMAS CONNER,
B. J. FETTIG.